United States Patent
Kidera et al.

(10) Patent No.: US 9,236,764 B2
(45) Date of Patent: Jan. 12, 2016

(54) DC POWER SUPPLY SYSTEM

(75) Inventors: Kazunori Kidera, Osaka (JP); Takuya Kagawa, Kyoto (JP); Hideki Tamura, Shiga (JP); Hiroyuki Nishino, Osaka (JP); Mariko Nishi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 460 days.

(21) Appl. No.: 13/814,540

(22) PCT Filed: Sep. 8, 2011

(86) PCT No.: PCT/IB2011/002095
§ 371 (c)(1),
(2), (4) Date: Feb. 6, 2013

(87) PCT Pub. No.: WO2012/035395
PCT Pub. Date: Mar. 22, 2012

(65) Prior Publication Data
US 2013/0140901 A1    Jun. 6, 2013

(30) Foreign Application Priority Data
Sep. 15, 2010    (JP) .................................. 2010-207253

(51) Int. Cl.
*H02J 7/00* (2006.01)
*H02J 9/00* (2006.01)
*H01M 10/44* (2006.01)
*H02J 7/34* (2006.01)

(52) U.S. Cl.
CPC ................. *H02J 9/00* (2013.01); *H01M 10/44* (2013.01); *H02J 7/34* (2013.01); *Y10T 307/625* (2015.04)

(58) Field of Classification Search
CPC ............. H02J 9/00; H01M 10/44; H02J 7/34; Y10T 307/625
USPC ........................................ 307/64–66; 320/108
See application file for complete search history.

(56) References Cited

U.S. PATENT DOCUMENTS

2005/0285570 A1\* 12/2005 Kumar et al. ................. 320/128
2006/0187689 A1    8/2006 Hartular
(Continued)

FOREIGN PATENT DOCUMENTS

| CN | 1428676 | 7/2003 |
| CN | 1838503 | 9/2006 |

(Continued)

OTHER PUBLICATIONS

Chinese Office Action and Search Report dated Jul. 30, 2014 for corresponding Chinese Application No. 201180039266.1.
(Continued)

*Primary Examiner* — Jared Fureman
*Assistant Examiner* — Alfonso Perez Borroto
(74) *Attorney, Agent, or Firm* — Renner, Otto, Boisselle & Sklar, LLP (57) ABSTRACT

A DC power supply system includes a DC power supply and a secondary battery for backing up the DC power supply. When a voltage of the DC power supply is lower than a voltage of the secondary battery, the DC power system adds an extra voltage to the voltage of the DC power supply to provide an input voltage to the secondary battery higher than the voltage of the secondary battery by using an electric power of the secondary battery, and the secondary battery is charged.

7 Claims, 6 Drawing Sheets

(56) References Cited

U.S. PATENT DOCUMENTS

2008/0084185 A1* 4/2008 Nakazawa .............. H02J 9/061
                                                    320/128
2009/0302681 A1* 12/2009 Yamada et al. ........... H02J 7/35
                                                     307/46
2010/0134305 A1* 6/2010 Lu et al. ................ H02J 7/0021
                                                   340/636.13

FOREIGN PATENT DOCUMENTS

| JP | H04-355634 | 12/1992 |
| JP | H11-178227 | 7/1999 |
| JP | U3083167 | 10/2001 |
| JP | 2008-048544 | 2/2008 |

OTHER PUBLICATIONS

International Search Report for corresponding International Application No. PCT/IB2011/002095 mailed Jan. 17, 2012.
Form PCT/ISA/237 for corresponding International Application No. PCT/IB2011/002095 dated Jan. 17, 2012.

* cited by examiner

DC POWER SUPPLY SYSTEM

FIELD OF THE INVENTION

The present invention relates to a DC power supply system which includes a secondary battery as a backup power source.

BACKGROUND OF THE INVENTION

Recently, there has been supplied a DC power supply system including a photovoltaic (solar) power generator or a household fuel cell.

However, an output power generated by solar cells is not stable because the amount of power generation changes due to weather conditions and temperature. Thus, it is generally provided with a secondary battery as a backup power source (see, e.g., Patent Document 1).

In the DC power supply system, a DC power supply such as a solar cell is connected in parallel with a circuit in which the secondary battery is connected in series with a parallel circuit of a DC/DC converter for charging the secondary battery and a DC/DC converter for discharging the secondary battery. Typically, the secondary battery has a voltage lower than a constant voltage of the DC power supply. When the voltage of the DC power supply is higher than the voltage of the secondary battery, a charging current flows in the secondary battery through the charging DC/DC converter to charge the secondary battery. In contrast, when the voltage of the DC power supply is lower than the voltage of the secondary battery, a discharging current flows from the secondary battery through the discharging DC/DC converter to supply an electric power from the secondary battery.

In the case of the photovoltaic power generator, the solar cell generates an electric power even when the electric power is not consumed at the load, and the electric power generated during this period of time is charged in the secondary battery. However, when the temperature of the solar cell itself becomes excessively high due to, e.g., an excessively sunny condition, the output voltage of the solar cell is rather reduced.

Patent Document 1 does not directly describe that the secondary battery is charged when the voltage of the DC power supply is lower than the voltage of the secondary battery, and only describes that the secondary battery can be charged by using, e.g., a DC/DC converter capable of stepping up a voltage. However, in the case of charging the secondary battery by stepping up the output voltage of the solar cell to be equal to or higher than the voltage of the secondary battery, the current flowing into the secondary side of the DC/DC converter becomes a value obtained by multiplying the current flowing into the primary side of the DC/DC converter by the conversion efficiency and the reciprocal of the boosting ratio, and the current value decreases considerably. In other words, the charging efficiency is reduced while the energy loss is increased.

Patent Document 1: Japanese Patent Application Publication No. 2008-48544

SUMMARY OF THE INVENTION

In view of the above, the present invention provides a DC power supply system capable of realizing a high charging efficiency and charging a secondary battery even when a voltage of a DC power supply is lower than a voltage of the secondary battery.

In accordance with an embodiment of the present invention, there is provided a DC power supply system including: a DC power supply; and a secondary battery for backing up the DC power supply. Further, when a voltage of the DC power supply is lower than a voltage of the secondary battery, the DC power supply system adds an extra voltage to the voltage of the DC power supply to provide an input voltage to the secondary battery higher than the voltage of the secondary battery by using an electric power of the secondary battery and charges the secondary battery.

In accordance with another embodiment of the present invention, there is provided a DC power supply system including: a DC power supply; a secondary battery for backing up the DC power supply; and a backup power supply circuit connected in parallel to the DC power supply, the backup power supply circuit including the secondary battery. The backup power supply circuit includes: a first charging DC/DC converter configured to charge the secondary battery when a voltage of the DC power supply is higher than a voltage of the secondary battery; a first discharging DC/DC converter configured to discharge an electric power charged in the secondary battery when a voltage of the DC power supply is higher than a voltage of the secondary battery; a second charging DC/DC converter configured to add an extra voltage to a voltage of the DC power supply by using an electric power of the secondary battery to charge the secondary battery when the voltage of the DC power supply is lower than a voltage of the secondary battery; a second discharging DC/DC converter configured to discharge an electric power charged in the secondary battery when a voltage of the DC power supply is lower than a voltage of the secondary battery; and a control circuit configured to control the first charging DC/DC converter, the first discharging DC/DC converter, the second charging DC/DC converter and the second discharging DC/DC converter.

Further, a first DC/DC converter may serve as the first charging DC/DC converter and the second discharging DC/DC converter, and a second DC/DC converter different from the first DC/DC converter may serve as the second charging DC/DC converter and the first discharging DC/DC converter.

Further, the second DC/DC converter may include input terminals connected in parallel to both terminals of the secondary battery; and output terminals connected in series with between a high voltage side terminal of the DC power supply and a high voltage side terminal of the secondary battery.

Further, the first DC/DC converter may include input terminals connected to the output terminals of the second DC/DC converter; and output terminals connected to the terminals of the secondary battery.

Further, an input side circuit of the first DC/DC converter and an output side circuit of the second DC/DC converter may include a bidirectional switch element having a lateral transistor structure using a GaN/AlGaN structure.

In accordance with the present invention, even when the voltage of the DC power supply is lower than the voltage of the secondary battery, for example, when an electric power consumed at the load is small, the extra voltage can be added to the voltage of the DC power supply by using an electric power of the secondary battery to charge the secondary battery. Accordingly, the electric power generated by a DC power supply such as photovoltaic power generator can be effectively stored and used. Further, since the voltage of the DC power supply is not directly stepped up by using a step-up DC/DC converter, the current supplied from the DC power supply may be directly used as a charging current, thereby obtaining high charging efficiency.

BRIEF DESCRIPTION OF THE DRAWINGS

The objects and features of the present invention will become apparent from the following description of embodiments, given in conjunction with the accompanying drawings.

DETAILED DESCRIPTION OF THE EMBODIMENTS

Hereinafter, an embodiment of the present invention will be described in detail with reference to the accompanying drawings which form a part hereof. Throughout the specification and drawings, like reference numerals will be given to like parts having substantially the same function and configuration, and a redundant description thereof will be omitted.

Figure 1:
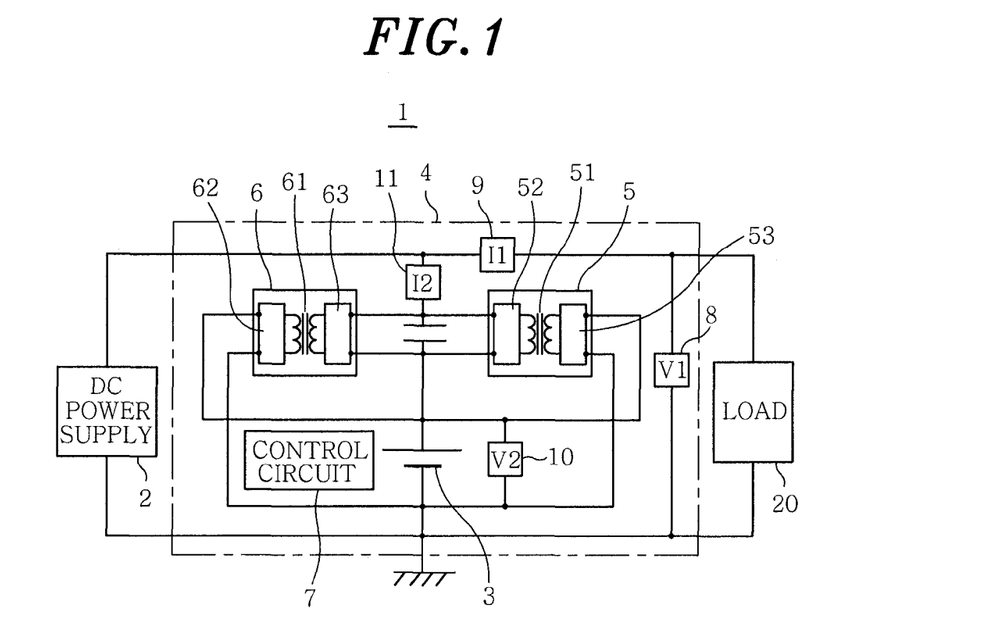
FIG. 1 is a circuit diagram showing a basic configuration of a DC power supply system in accordance with an embodiment of the present invention.

A DC power supply system in accordance with an embodiment of the present invention will be described. A DC power supply system 1 includes: a DC power supply 2, such as a solar cell, a household fuel cell, or the like; and a backup power supply circuit 4 connected in parallel with the DC power supply 2 and including a secondary battery 3 for backing up the DC power supply.

The backup power supply circuit 4 includes a first DC/DC converter 5 and a second DC/DC converter 6, which are connected in parallel to each other; the secondary battery 3 connected in series with the above parallel circuit; and a control circuit 7 for controlling the first DC/DC converter and the second DC/DC converter 6. Further, the backup power supply circuit 4 includes: a first voltage detector 8 for detecting a voltage V1 of the DC power supply 2; and a second voltage detector 10 for detecting a voltage V2 of the secondary battery 3. In addition, if necessary, the backup power supply circuit 4 may include: a first current detector 9 for detecting a current I1 flowing through a load 20; and a second current detector 11 for detecting a charging current or a discharging current I2 flowing through the backup power supply circuit 4.

Input terminals of the second DC/DC converter 6 are connected in parallel to both terminals of the secondary battery 3. Output terminals of the second DC/DC converter 6 are connected in series with between a high voltage side terminal of the DC power supply 2 and a high voltage side terminal of the secondary battery 3.

Further, input terminals of the first DC/DC converter 5 are connected to the output terminals of the second DC/DC converter 6. Output terminals of the first DC/DC converter 5 are connected to both terminals of the secondary battery 3.

Each of the first DC/DC converter 5 and the second DC/DC converter 6 may function as a discharging DC/DC converter, or may function as a charging DC/DC converter depending on whether or not the voltage V1 of the DC power supply 2 is higher than the voltage V2 of the secondary battery 3.

Specifically, when the voltage V1 of the DC power supply 2 is higher than the voltage V2 of the secondary battery 3 (V1>V2), the first DC/DC converter 5 functions as a first charging DC/DC converter for charging the secondary battery 3, and the second DC/DC converter 6 functions as a first discharging DC/DC converter for discharging the electric power charged in the secondary battery 3.

In contrast, when the voltage V1 of the DC power supply 2 is lower than the voltage V2 of the secondary battery 3 (V2>V1), the second DC/DC converter 6 functions as a second charging DC/DC converter for charging the secondary battery 3, and the first DC/DC converter 5 functions as a second discharging DC/DC converter for discharging the electric power charged in the secondary battery 3.

Figure 6:
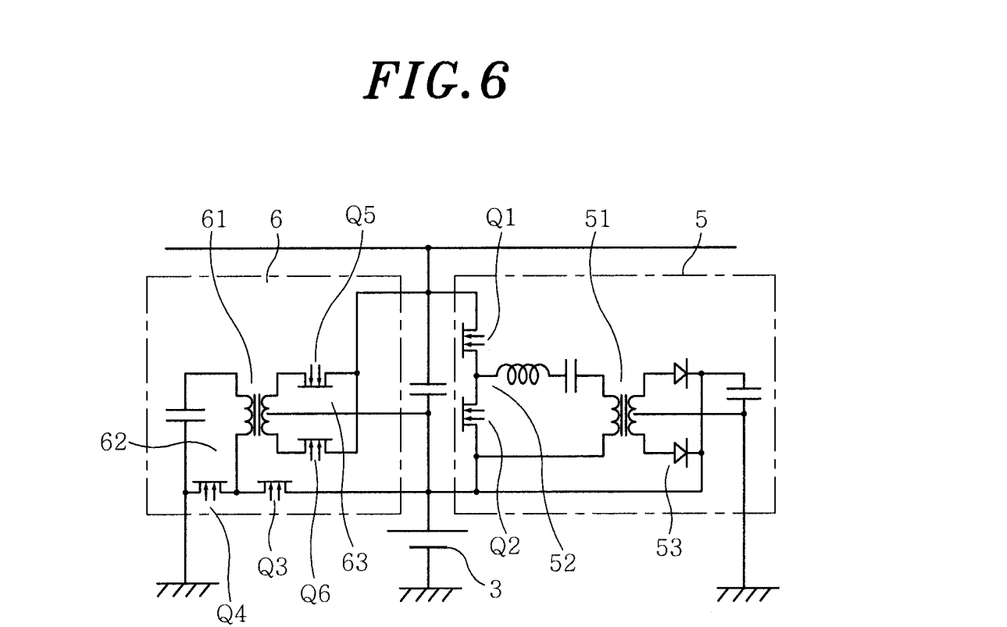
FIG. 6 shows a specific circuit configuration of the first DC/DC converter and the second DC/DC converter in the DC power supply system.

The first DC/DC converter 5 includes a transformer 51, an input side (primary side) circuit 52, and an output side (secondary side) circuit 53. Further, the second DC/DC converter 6 includes a transformer 61, an input side (primary side) circuit 62, and an output side (secondary side) circuit 63. FIG. 6 shows a specific circuit configuration of the first DC/DC converter 5 and the second DC/DC converter 6. The circuit configuration will be later described.

The control circuit 7 compares the voltage V1 of the DC power supply 2 that has been detected by the first voltage detector 8 with the voltage V2 of the secondary battery 3 that has been detected by the second voltage detector 10. The control circuit 7, based on the comparison result, controls the input side circuits 52 and 62 of the first DC/DC converter 5 and the second DC/DC converter 6. Hereinafter, a specific operation will be described for the case when the voltage V1 of the DC power supply 2 is higher than the voltage V2 of the secondary battery 3 (V1>V2) and the case when the voltage V1 of the DC power supply 2 is lower than the voltage V2 of the secondary battery 3 (V2>V1). Further, for the sake of convenience, the voltage of the secondary battery 3 is fixed to 380 V, but a current value may be determined optionally.

Specific Operation Example 1

Figure 2:
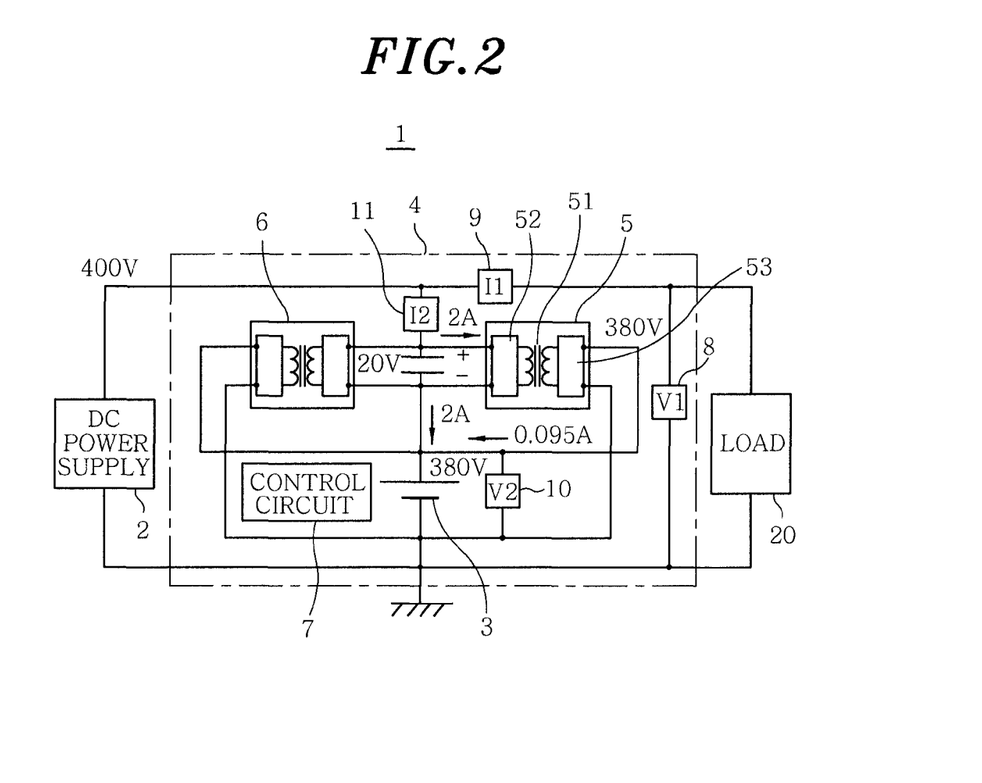
FIG. 2 is a circuit diagram showing an operation of the DC power supply system when a voltage of the DC power supply is higher than a voltage of the secondary battery, and the secondary battery is being charged.

FIG. 2 shows the case when the voltage V1 of the DC power supply 2 is higher than the voltage V2 of the secondary battery 3 (V1>V2) and the secondary battery 3 is being charged. This corresponds to, e.g., a case when the electric power consumption at the load 20 is small, and the electric power generated in the DC power supply 2 is large enough. The first DC/DC converter 5 functions as a first charging DC/DC converter.

As shown in FIG. 2, it is assumed that the voltage V1 of the DC power supply 2 is 400 V, and the voltage V2 of the secondary battery 3 is 380 V. The control circuit 7 drives the input side (primary side) circuit 52 of the first DC/DC converter 5 to make a current flow from the DC power supply 2 into the backup power supply circuit 4 based on the result of comparing the voltage V1 of the DC power supply 2 with the voltage V2 of the secondary battery 3.

It will be assumed that a current of 2 A flows into the backup power supply circuit 4 from the DC power supply 2. Since the input side of the first DC/DC converter 5 has a potential difference of 20 V and the current of 2 A flows into the input side (primary side) circuit 52, the input power becomes 40 W (20 V×2 A). Assuming that the first DC/DC converter 5 has an efficiency of 90%, the output side (the output side circuit 53) of the first DC/DC converter 5 has an output power of 36 W (40 W×0.9). In the first DC/DC converter 5, the boosting ratio is determined to generate a voltage of 380 V on the secondary side thereof in order to charge the secondary battery 3. The current of 0.095 A (36 W÷380 V) flows into the output side circuit 53 of the first DC/DC converter 5.

Since the current of 2 A, which flows through the input side circuit 52 of the first DC/DC converter 5, directly flows to the ground through the secondary battery 3, the current of 2 A on the input side and the current of 0.095 A on the output side are combined to flow a current of 2.095 A through the secondary battery 3. The DC power supply 2 outputs an electric power of 800 W (400 V×2 A) therefrom, and the secondary battery 3 charges an electric power of 796 W (380 V×2.095 A) therein. In other words, the DC power supply system has a total charging efficiency of 0.995 (796 W÷800 W), so that the charging circuit having a very high efficiency can be obtained. During this period of time, the second DC/DC converter 6 is not operated. Further, the current flowing through the output side circuit 53 of the first DC/DC converter 5 is controlled by detecting the charging current I2 through the second current detector 11, thereby controlling the charging current to be constant.

Specific Operation Example 2

Figure 3:
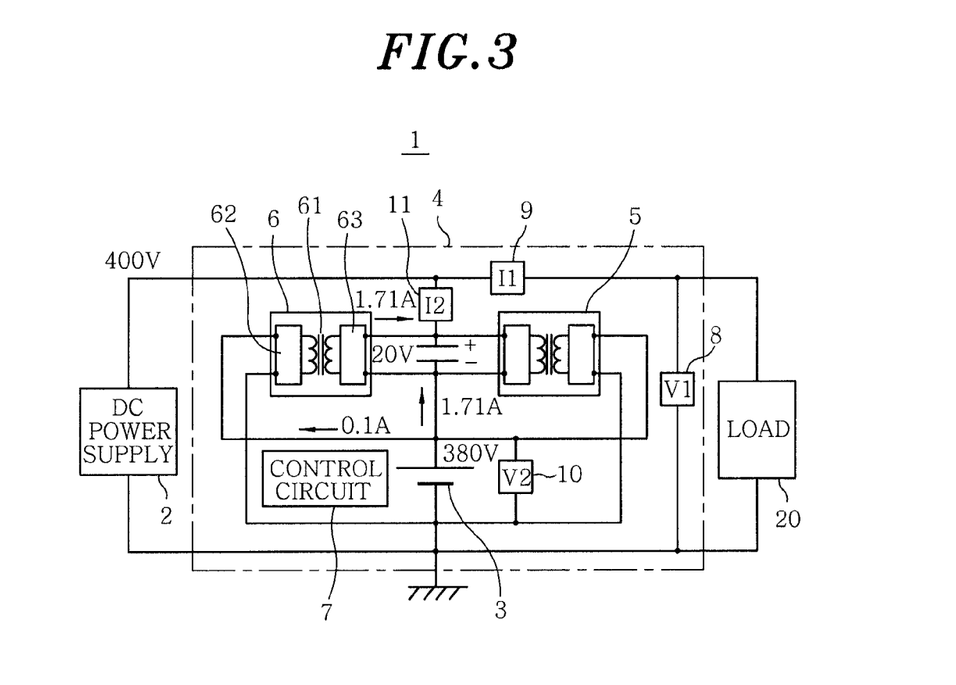
FIG. 3 is a circuit diagram showing an operation of the DC power supply system when a voltage of the DC power supply is higher than a voltage of the secondary battery, and the secondary battery is being discharged.

FIG. 3 shows the case when the voltage V1 of the DC power supply 2 is higher than the voltage V2 of the secondary battery 3 (V1>V2) and the secondary battery 3 is being discharged. This corresponds to, e.g., a case when the output power of the DC power supply 2 such as a solar cell decreases, or the electric power generated in the DC power supply 2 is insufficient to cover an electric power demanded at the load 20 because the electric power is large. The second DC/DC converter 6 functions as a first discharging DC/DC converter.

The control circuit 7 drives the input side (primary side) circuit 62 of the second DC/DC converter 6 based on the comparative result of the voltage V1 of the DC power supply 2 with the voltage V2 of the secondary battery 3, and flows the current of, e.g., 0.1 A into the input side circuit 62 of the second DC/DC converter 6. The second DC/DC converter 6 generates an extra voltage to be added to the voltage V2 (380 V) of the secondary battery 3 to provide a voltage equal to or higher than the voltage V1 (400 V) of the DC power supply 2.

Since the current of 0.1 A flows into the input side circuit of the second DC/DC converter 6, the second DC/DC converter 6 will obtain an input power of 38 W (380 V×0.1 A). Assuming that the second DC/DC converter 6 has an efficiency of 90%, the second DC/DC converter 6 will obtain an output power of 34.2 W (38 W×0.9) in the output side. A step-down ratio of the second DC/DC converter 6 is designed such that the second DC/DC converter 6 obtains the extra voltage of 20 V on the secondary side thereof in order to supplement the voltage difference between the DC power supply 2 and the secondary battery 3. The current of 1.71 A (34.2 W÷20 V) flows into the output side circuit 63 of the second DC/DC converter 6.

Since the current flows into the secondary battery 3 as well as flows through the output side circuit 63 of the second DC/DC converter 6, the current flowing through the input side circuit 62 and the current flowing through the output side circuit 63 are combined to flow a current of 1.81 A (0.1 A+1.71 A) through the secondary battery 3. The electric power of 687.8 W (380 V×1.81 A) is discharged from the secondary battery 3. In contrast, the electric power supplied to the load 20 from the secondary battery 3 is 684 W (400 V×1.71 A). Accordingly, the DC power supply system has a total discharging efficiency of 0.994 (684 W÷687.8 W), thereby obtaining very high efficiency in the discharging circuit. During this period of time, the first DC/DC converter 5 is not operated.

Specific Operation Example 3

Figure 4:
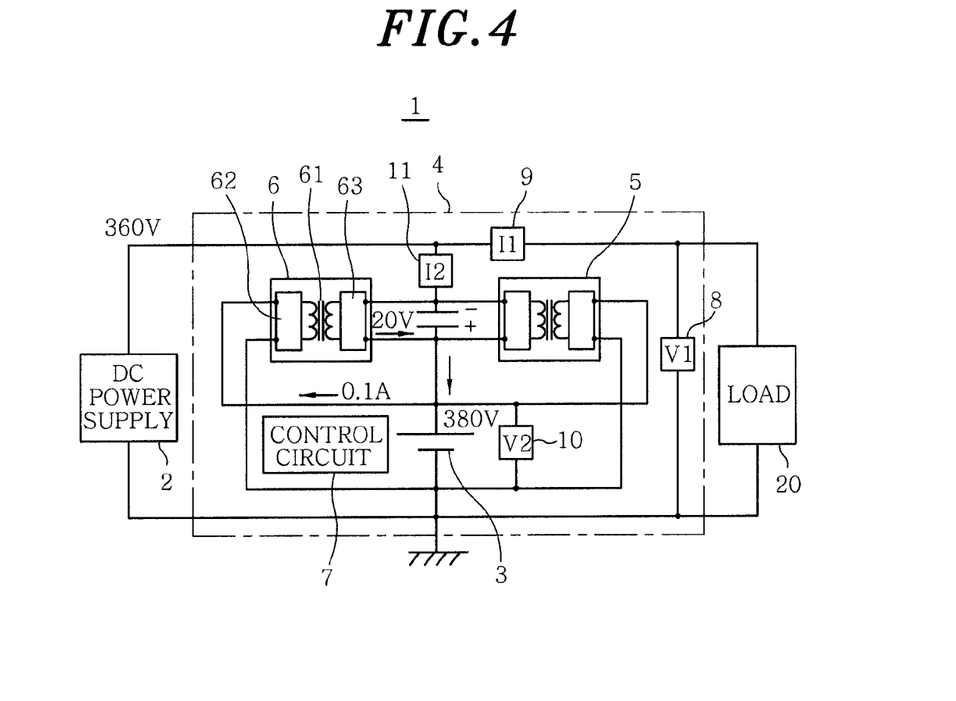
FIG. 4 is a circuit diagram showing an operation of the DC power supply system when a voltage of the DC power supply is lower than a voltage of the secondary battery, and the secondary battery is being charged.

FIG. 4 shows the case when the voltage V1 of the DC power supply 2 is lower than the voltage V2 of the secondary battery 3 (V2>V1) and the secondary battery 3 is being charged. This corresponds to, e.g., a case when the electric power consumption at the load 20 is small, and the output voltage of the DC power supply 2 such as a solar cell decreases. The second DC/DC converter 6 functions as a second charging DC/DC converter.

The control circuit 7 drives the input side (primary side) circuit 62 of the second DC/DC converter 6 based on the comparative result of the voltage V1 of the DC power supply 2 with the voltage V2 of the secondary battery 3, and flows the current of, e.g., 0.1 A into the input side circuit 62 of the second DC/DC converter 6. The second DC/DC converter 6 generates an extra voltage to be added to the voltage V1 (360 V) of the DC power supply 2 to provide a voltage equal to or higher than the voltage V2 (380 V) of the secondary battery 3. The extra voltage generated in the output side (secondary side) circuit 63 of the second DC/DC converter 6 has an opposite polarity as compared with the case shown in FIG. 3.

As in the above case, when the current of 0.1 A flows into the input side circuit 62 of the second DC/DC converter 6, the second DC/DC converter 6 will obtain an input power of 38 W (380 V×0.1 A). Assuming that the second DC/DC converter 6 has an efficiency of 90%, the second DC/DC converter 6 will obtain an output power of 34.2 W (38 W×0.9) in the output side. A boosting ratio of the second DC/DC converter 6 is designed such that the second DC/DC converter 6 obtains the extra voltage on the secondary side thereof in order to supplement the voltage difference of 20 V between the DC power supply 2 and the secondary battery 3. The current of 1.71 A (34.2 W÷20 V) flows into the output side circuit 63 of the second DC/DC converter 6. However, the direction of the current flow is opposite.

Flowing the current through the output side circuit 63 of the second DC/DC converter 6 causes the DC power supply 2 to supply an electric power to the backup power supply circuit 4 for charging the secondary battery 3. The current of 1.61 A (1.71 A−0.1 A), which is obtained by subtracting the current flowing through the input side circuit 62 from the current flowing through the output side circuit 63 of the second DC/DC converter 6, actually flows into the secondary battery 3 as a charging current.

The electric power of 616 W (360 V×1.71 A) is outputted from the DC power supply 2, and the electric power of 612 W (380 V×1.61 A) is charged in the secondary battery 3. In other words, the DC power supply system has an total charging efficiency of 0.994 (612 W÷616 W), thereby obtaining very high efficiency in the charging circuit. During this period of time, the first DC/DC converter 5 is not operated. Further, the current flowing through the input side circuit 62 of the second DC/DC converter 6 is controlled by detecting the charging current through the second current detector 11, thereby controlling the charging current to be constant.

Specific Operation Example 4

Figure 5:
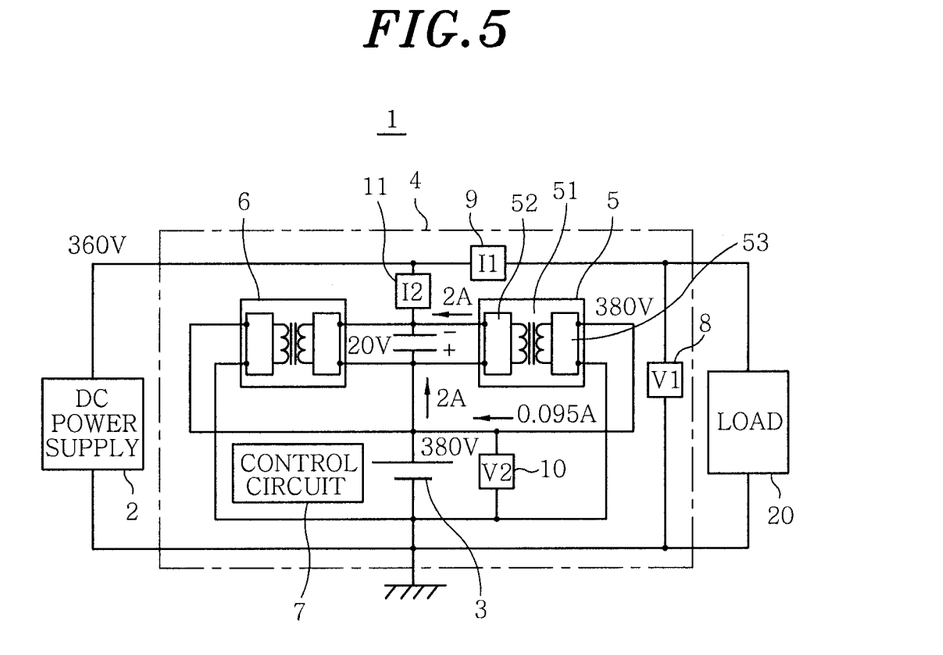
FIG. 5 is a circuit diagram showing an operation of the DC power supply system when a voltage of the DC power supply is lower than a voltage of the secondary battery, and the secondary battery is being discharged.

FIG. 5 shows the case when the voltage V1 of the DC power supply 2 is lower than the voltage V2 of the secondary battery 3 (V2>V1), and the secondary battery 3 is being discharged. For example, in this case, although the voltage of the DC power supply 2 is low, the load 20 may continue to be driven. In this example, the secondary battery 3 merely functions to assist the DC power supply 2, and the backup power supply circuit 4 drops the voltage of the secondary battery 3 to the voltage of the DC power supply 2 and then outputs it. The first DC/DC converter 5 functions as a second charging DC/DC converter.

The control circuit 7 drives the input side (primary side) circuit 52 of the first DC/DC converter 5 based on the value of the load current I1 detected by the first current detector 9, and flows the current of, e.g., 2 A into the input side circuit 52 of the first DC/DC converter 5. The input side circuit 52 of the first DC/DC converter 5 steps down the voltage V2 (380 V) of the secondary battery 3 to the voltage V1 (360 V) of the DC power supply 2. Simultaneously, at the output side of the first DC/DC converter 5, a voltage of 380 V is generated to charge the secondary battery 3.

When the current of 2 A flows into the input side circuit 52 of the first DC/DC converter 5, the first DC/DC converter 5 will obtain an input power of 40 W ((380 V−360 V)×2 A). Assuming that the first DC/DC converter 5 has an efficiency of 90%, the first DC/DC converter 5 will obtain an output power of 36 W (40 W×0.9) in the output side. The charging current of 0.095 A (36 W÷380 V) flows into the output side circuit 53 of the first DC/DC converter 5.

Since this charging current is returned to the secondary battery 3, the current of 1.905 A, which is obtained by subtracting the charging current of 0.095 A from the current of 2 A, flows out of the secondary battery 3, whereby the electric power of 724 W (380 V×1.905 A) is discharged from the secondary battery 3. In contrast, the electric power supplied to the load from the secondary battery 3 is 720 W (360 V×2 A). Accordingly, the DC power supply system has a total discharging efficiency of 0.994 (720 W÷724 W), thereby obtaining very high efficiency in the discharging circuit. During this period of time, the second DC/DC converter 6 is not operated. Further, the current (charging current) flowing through the output side circuit 53 of the first DC/DC converter 5 is controlled, thereby controlling the discharging current flowing to the load 20 from the secondary battery 3 to be constant.

As described above, each of the first DC/DC converter 5 and the second DC/DC converter 6 functions as a discharging DC/DC converter or a charging DC/DC converter depending on whether or not the voltage of the DC power supply 2 is higher than the voltage of the secondary battery 3.

When the first DC/DC converter 5 functions as the first charging DC/DC converter, both the direction of the current flowing to the input side and the polarity of the voltage of the input terminals are reversed as compared with the case where the first DC/DC converter 5 functions as the second discharging DC/DC converter. Similarly, when the second DC/DC converter 6 functions as the second charging DC/DC converter, both the direction of the current flowing to the output side and the polarity of the voltage of the output terminals are reversed as compared with the case where the second DC/DC converter 6 functions as the first discharging DC/DC converter.

Therefore, as shown in FIG. 6, bidirectional switch elements are used as switch elements included in the input side circuit 52 of the first DC/DC converter 5 and the output side circuit 63 of the second DC/DC converter 6.

As shown in FIG. 6, the input side circuit 52 of the first DC/DC converter 5 has two bidirectional switches Q1 and Q2 which are connected in series. A series circuit of a capacitor, an inductor and a primary winding of the transformer 51 is connected in parallel to the bidirectional switch Q2. By turning on and off the bidirectional switches Q1 and Q2 at a predetermined frequency, a pulse current flows through the primary winding of the transformer 51, thereby generating an electromotive force in a secondary winding. Since the current bi-directionally flows through the input side circuit 52, the polarity of the voltage inputted to the output side circuit 53 is alternately changed according to the direction of the current. Therefore, the output side circuit 53 includes diodes such that the current produced by the electromotive force generated in the secondary winding of the transformer 51 always flows in the same direction in order to charge the secondary battery 3.

The input side circuit 62 of the second DC/DC converter 6 has two switches Q3 and Q4 which are connected in series. A series circuit of a capacitor and a primary winding of the transformer 61 is connected in parallel to the switch Q4. By turning on and off the switches Q3 and Q4 at a predetermined frequency, a pulse current flows through the primary winding of the transformer 61, thereby generating an electromotive force in a secondary winding. In addition, since the current always flows in the same direction in the input side circuit 62, the polarity of the voltage inputted to the output side circuit 63 is constant.

However, as described above, when the second DC/DC converter 6 functions as a discharging DC/DC converter, the direction of the current is reversed as compared with the case where the second DC/DC converter 6 functions as a charging DC/DC converter. Therefore, the output side circuit 63 includes two bidirectional switches Q5 and Q6 connected to the secondary winding of the transformer 61. Then, by turning off the bidirectional switch Q6 when the bidirectional switch Q5 is turned on and turning off the bidirectional switch Q5 when the bidirectional switch Q6 is turned on, the direction of the current flowing into the output side circuit 63 is reversed. Further, since the current always flows in the same direction in the input side circuit 62, the switches Q3 and Q4 are not necessary to be bidirectional switches, and may be, e.g., MOSFETs.

Figure 7:
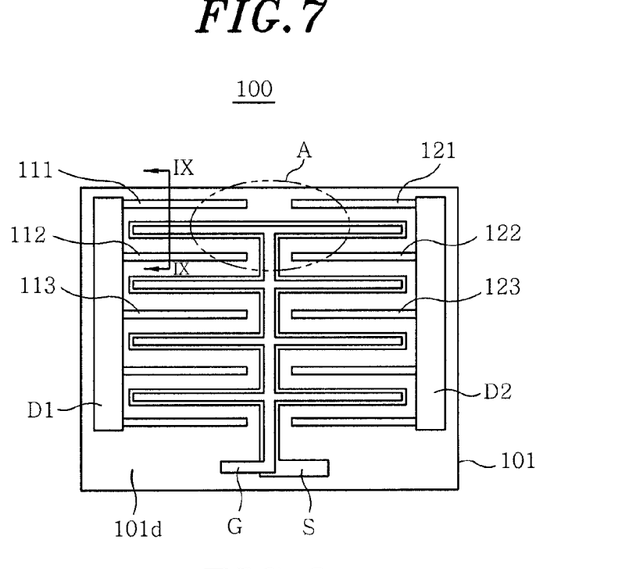
FIG. 7 is a plan view showing a configuration of a bidirectional switch element (single gate type).
Figure 8:
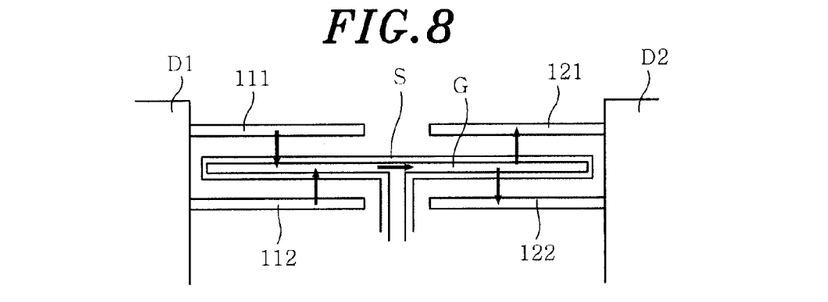
FIG. 8 is an enlarged view of area A shown in FIG. 7.
Figure 9:
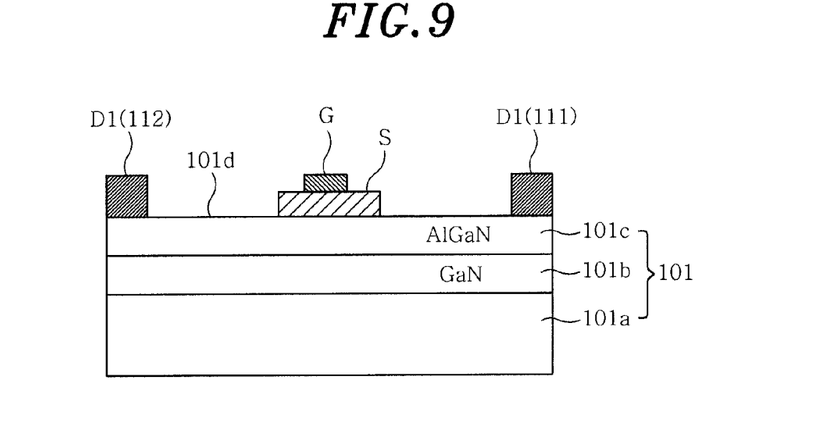
FIG. 9 is a cross-sectional view taken along line IX-IX shown in FIG. 7.

As a specific example of the bidirectional switch, a bidirectional switch element 100 having a lateral transistor structure using a GaN/AlGaN structure will be described in detail. FIG. 7 is a plan view showing a configuration of the bidirectional switch element 100. FIG. 8 is an enlarged view of area A shown in FIG. 7, and FIG. 9 is a cross-sectional view taken along line IX-IX shown in FIG. 7. Further, the bidirectional switch element 100 is referred to as a single gate type because only one gate G is provided between two electrodes D1 and D2.

As shown in FIG. 9, a substrate 101 of the bidirectional switch element 100 includes a conductive layer 101a, and a GaN layer 101b and an AlGaN layer 101c which are formed on the conductive layer 101a. In this embodiment, a two-dimensional electron gas layer, which is generated at a hetero-interface between AlGaN and GaN, is used as a channel layer. As shown in FIG. 7, a first electrode D1 and a second electrode D2, and an intermediate potential portion S having an intermediate potential between the potentials of the first and the second electrode D1 and D2 are formed on a surface 101*d* of the substrate 101. Further, a control electrode (gate) G is formed on the intermediate potential portion S. For example, a Schottky electrode is used as the control electrode G.

The first electrode D1 has a comb shape having electrode portions 111, 112, 113 . . . arranged in parallel to one another, and the second electrode D2 has a comb shape having electrode portions 121, 122, 123 . . . arranged in parallel to one another. The comb-shaped electrode portions of the first electrode D1 and the comb-shaped electrode portions of the second electrode D2 are arranged opposite to each other. Since the intermediate potential portion S and the control electrode G are respectively disposed between the comb-shaped electrode portions 111, 112, 113 . . . and 121, 122, 123 . . . , they have a shape (substantially fish spine shape) similar to the planar shape of the space defined between the electrode portions.

Next, a lateral transistor structure of the bidirectional switch element 100 will be described. As shown in FIG. 8, the electrode portion 111 of the first electrode D1 and the electrode portion 121 of the second electrode D2 are arranged such that the center lines in the width direction thereof are aligned. In addition, the intermediate potential portion S and the control electrode G are positioned in parallel to the electrode portion 111 of the first electrode D1 and the electrode portion 121 of the second electrode D2. Distances in the width direction from the electrode portion 111 of the first electrode D1 and the electrode portion 121 of the second electrode D2 to the intermediate potential portion S and the control electrode G are set such that a predetermined withstand voltage can be maintained. Distances in the longitudinal direction of the electrode portion 111 of the first electrode D1 and the electrode portion 121 of the second electrode D2, i.e., perpendicular to the width direction are also set in the same manner.

In addition, such relationships are the same as those of the other electrode portions 112 and 122, and 113 and 123. That is, the intermediate potential portion S and the control electrode G are disposed at positions at which a predetermined withstand voltage can be maintained with respect to the first electrode D1 and the second electrode D2.

Therefore, assuming that the first electrode D1 is in a high potential side and the second electrode D2 is in a low potential side, when the bidirectional switch element 100 is turned off, the current is completely interrupted between at least the first electrode D1, and the control electrode G and the intermediate potential portion S (the current is blocked directly under the control electrode (gate) G).

In contrast, when the bidirectional switch element 100 is turned on, i.e., when a signal having a voltage equal to or higher than a predetermined threshold is applied to the control electrode G, a current flows through a path of the first electrode D1 (electrode portion 111 . . . ), the intermediate potential portion S, and the second electrode D2 (electrode portion 121 . . . ) as indicated by the arrow in the figure, and vice versa.

As a result, even though a threshold voltage of the signal applied to the control electrode G is lowered to the required minimum level, it is possible to securely turn on/off the bidirectional switch element 100, thereby enabling a low on-resistance. Further, since the electrode portions 111 112, 113 . . . of the first electrode D1 and the electrode portions 121, 122, 123 . . . of the second electrode D2 can be arranged in a comb shape, a high current can be obtained without increasing a chip size of the bidirectional switch element 100.

Figure 10:
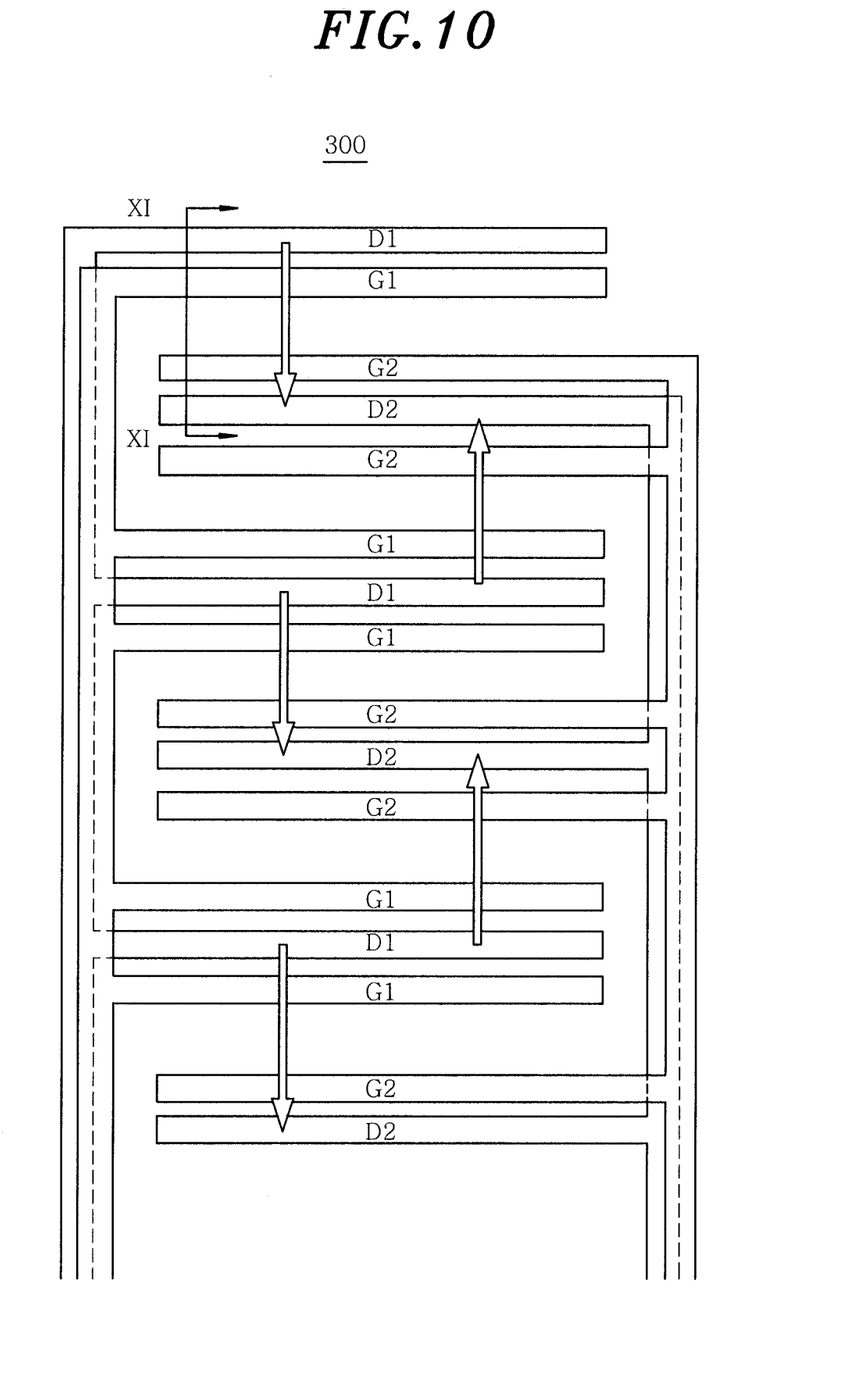
FIG. 10 is a plan view showing a configuration of a bidirectional switch element (dual gate type).
Figure 11:
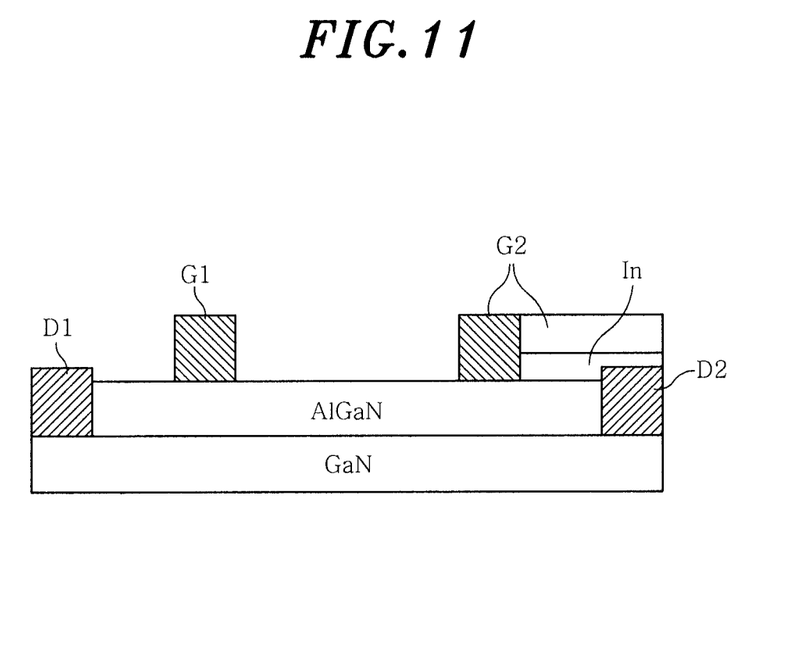
FIG. 11 is a cross-sectional view taken along line XI-XI shown in FIG. 10.

FIGS. 10 and 11 show a configuration of another bidirectional switch element 300 having a lateral transistor structure using a GaN/AlGaN structure. FIG. 10 is a plan view showing the configuration of the bidirectional switch element 300. FIG. 11 is a cross-sectional view taken along line XI-XI shown in FIG. 10. Further, the bidirectional switch element 300 is referred to as a dual gate type because two gates G1 and G2 are provided between two electrodes D1 and D2.

As shown in FIGS. 10 and 11, the bidirectional switch element 300 of the lateral dual gate transistor structure is configured to have a single portion for maintaining a withstand voltage, so that it is possible to implement a bidirectional switch element with a small loss. In other words, the drain electrodes D1 and D2 are formed on the GaN layer, and the gate electrodes G1 and G2 are formed on the AlGaN layer. In a state where no voltage is applied to the gate electrodes G1 and G2, an electron depletion region occurs in the two-dimensional electron gas layer generated at the AlGaN/GaN heterogeneous interface directly below the gate electrodes G1 and G2, and no current flows. In contrast, when a voltage is applied to the gate electrodes G1 and G2, a current flows in the AlGaN/GaN heterogeneous interface from the drain electrode D1 toward the drain electrode D2 (or reversely).

To obtain a withstand voltage, a predetermined distance is required between the gate electrodes G1 and G2. However, no withstand voltage is required between the drain electrode D1 and the gate electrode G1, and between the drain electrode D2 and the gate electrode G2. Therefore, the drain electrode D1 and the gate electrode G1, or the drain electrode D2 and the gate electrode G2 may be overlapped with each other via an insulating layer In interposed therebetween. Further, the element with such a configuration needs to be controlled based on the voltages of the drain electrodes D1 and D2, and therefore it is necessary to input a drive signal to the respective gate electrodes G1 and G2 (thus, referred to as a dual gate transistor structure).

As described above, in accordance with the present invention, even when the voltage V1 of the DC power supply 2 is lower than the voltage V2 of the secondary battery 3, the current from the secondary battery 3 is made to flow into the input side circuit 62 of the second DC/DC converter 6 to generate a voltage in the secondary winding of the transformer 61. Then, the extra voltage outputted to the output side circuit 63 is added to provide a voltage higher than the voltage of the secondary battery 3, and the secondary battery 3 is charged. Accordingly, the electric power generated by a DC power supply such as photovoltaic power generator can be effectively stored and used.

Furthermore, by using the bidirectional switches in the input side circuit 52 of the first DC/DC converter 5 and the output side circuit 63 of the second DC/DC converter 6, the current can flow through the identical DC/DC converter in the opposite directions depending on the charging and discharging operation. That is, since a single DC/DC converter can be used as a charging DC/DC converter and a discharging DC/DC converter, it is possible to achieve the downsizing and cost reduction of the backup power supply circuit 4. Further, by using a bidirectional switch element having a lateral transistor structure using a GaN/AlGaN structure, which does not include a parasitic diode, as a bidirectional switch, it is possible to realize the backup power supply circuit 4 with a low loss.

Further, the present invention is not limited to the configuration of the above embodiment, but various modifications may be made. For example, as a bidirectional switch, there may be used two MOSFETs whose parasitic diodes are connected in series opposed to each other, or other bidirectional switches such as a triac may be used. In addition, the numerical values described in the above embodiment are used for making the description of the present invention understandable, so it is needless to say that they are not actual values.

While the invention has been shown and described with respect to the embodiments, it will be understood by those skilled in the art that various changes and modification may be made without departing from the scope of the invention as defined in the following claims.

What is claimed is:

1. A DC power supply system comprising:
   a DC power supply;
   a secondary battery for backing up the DC power supply; and
   a backup power supply circuit connected in parallel to the DC power supply, the backup power supply circuit including the secondary battery,
   wherein the backup power supply circuit includes:
   a first charging DC/DC converter configured to charge the secondary battery when a voltage of the DC power supply is higher than a voltage of the secondary battery;
   a first discharging DC/DC converter configured to discharge an electric power charged in the secondary battery when a voltage of the DC power supply is higher than a voltage of the secondary battery;
   a second charging DC/DC converter configured to add an extra voltage to a voltage of the DC power supply by using an electric power of the secondary battery to charge the secondary battery when the voltage of the DC power supply is lower than a voltage of the secondary battery;
   a second discharging DC/DC converter configured to discharge an electric power charged in the secondary battery when a voltage of the DC power supply is lower than a voltage of the secondary battery; and
   a control circuit configured to control the first charging DC/DC converter, the first discharging DC/DC converter, the second charging DC/DC converter and the second discharging DC/DC converter.

2. The DC power supply system of claim 1, wherein a first DC/DC converter serves as the first charging DC/DC converter and the second discharging DC/DC converter, and a second DC/DC converter different from the first DC/DC converter serves as the second charging DC/DC converter and the first discharging DC/DC converter.

3. The DC power supply system of claim 2, wherein the second DC/DC converter comprises: input terminals connected in parallel to both terminals of the secondary battery; and output terminals connected in series with between a high voltage side terminal of the DC power supply and a high voltage side terminal of the secondary battery.

4. The DC power supply system of claim 3, wherein the first DC/DC converter comprises: input terminals connected to the output terminals of the second DC/DC converter; and output terminals connected to the terminals of the secondary battery.

5. The DC power supply system of claim 2, wherein an input side circuit of the first DC/DC converter and an output side circuit of the second DC/DC converter comprise a bidirectional switch element having a lateral transistor structure using a GaN/AlGaN structure.

6. The DC power supply system of claim 3, wherein an input side circuit of the first DC/DC converter and an output side circuit of the second DC/DC converter comprise a bidirectional switch element having a lateral transistor structure using a GaN/AlGaN structure.

7. The DC power supply system of claim 4, wherein an input side circuit of the first DC/DC converter and an output side circuit of the second DC/DC converter comprise a bidirectional switch element having a lateral transistor structure using a GaN/AlGaN structure.

* * * * *